(12) United States Patent
Weimer et al.

(10) Patent No.: US 12,337,612 B2
(45) Date of Patent: Jun. 24, 2025

(54) SEAL MECHANISM FOR WHEEL ASSEMBLIES

(71) Applicant: The Government of the United States of America, as represented by the Secretary of Homeland Security, Washington, DC (US)

(72) Inventors: William E. Weimer, Virginia Beach, VA (US); Jason L. Mills, Camden, NC (US); Graham R. Harrison, III, Currituck, NC (US); Joshua B. Bowen, Elizabeth City, NC (US); Samuel Benavides, Edenton, NC (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/591,682

(22) Filed: Feb. 29, 2024

(65) Prior Publication Data
US 2024/0308269 A1 Sep. 19, 2024

Related U.S. Application Data

(60) Provisional application No. 63/452,496, filed on Mar. 16, 2023.

(51) Int. Cl.
| | |
|---|---|
| *B60B 25/00* | (2006.01) |
| *B60B 3/08* | (2006.01) |
| *B60B 25/22* | (2006.01) |
| *B60B 27/00* | (2006.01) |

(52) U.S. Cl.
CPC .............. *B60B 25/008* (2013.01); *B60B 3/08* (2013.01); *B60B 25/22* (2013.01); *B60B 27/0073* (2013.01)

(58) Field of Classification Search
CPC ....... B60B 21/12; B60B 25/008; B60B 3/085; B60B 3/08; B60B 3/087
USPC ....................................... 301/63.102, 64.306
See application file for complete search history.

(56) References Cited

U.S. PATENT DOCUMENTS

| | | | | |
|---|---|---|---|---|
| 3,155,429 A | * | 11/1964 | Metzler | B60B 11/10 301/40.3 |
| 3,826,538 A | * | 7/1974 | Lipper | B60B 25/22 301/64.306 |
| 4,223,952 A | * | 9/1980 | Weld | B60B 25/22 301/64.302 |
| 4,294,491 A | * | 10/1981 | Black | B60B 27/0094 301/105.1 |

(Continued)

*Primary Examiner* — Jason R Bellinger
(74) *Attorney, Agent, or Firm* — Lavanya Besch; Robert W. Busby; Kelly G. Hyndman

(57) ABSTRACT

In an example, a seal for a wheel assembly includes a first disk half and a second disk half. The seal includes a cylindrical body having a hollow interior, a first seal end configured to mate with a first inner disk surface of the first disk half, and a second seal end configured to mate with a second inner disk surface of the second disk half, and one or more drain holes. The cylindrical body has a cylindrical wall with the one or more drain holes configured to substantially deflect incoming matter from impinging upon the hollow interior and to allow condensate to evacuate from the hollow interior through the one or more drain holes. The cylindrical body includes an elastomeric material.

25 Claims, 11 Drawing Sheets

(56) References Cited

U.S. PATENT DOCUMENTS

| | | | | |
|---|---|---|---|---|
| 4,640,330 | A | * | 2/1987 | Frassica ............... B60B 25/008 <br> 152/404 |
| 5,833,324 | A | * | 11/1998 | Conradsson ...... B29C 45/14467 <br> 301/5.1 |
| 6,000,762 | A | * | 12/1999 | Chang ..................... B60B 3/08 <br> 301/63.103 |
| 7,775,605 | B2 | * | 8/2010 | Henline .................. B60B 3/12 <br> 301/6.3 |
| 2003/0080609 | A1 | * | 5/2003 | Darnell ................. B60B 25/08 <br> 301/95.11 |
| 2010/0225156 | A1 | * | 9/2010 | Lipper .................... B60B 3/06 <br> 301/29.2 |

* cited by examiner

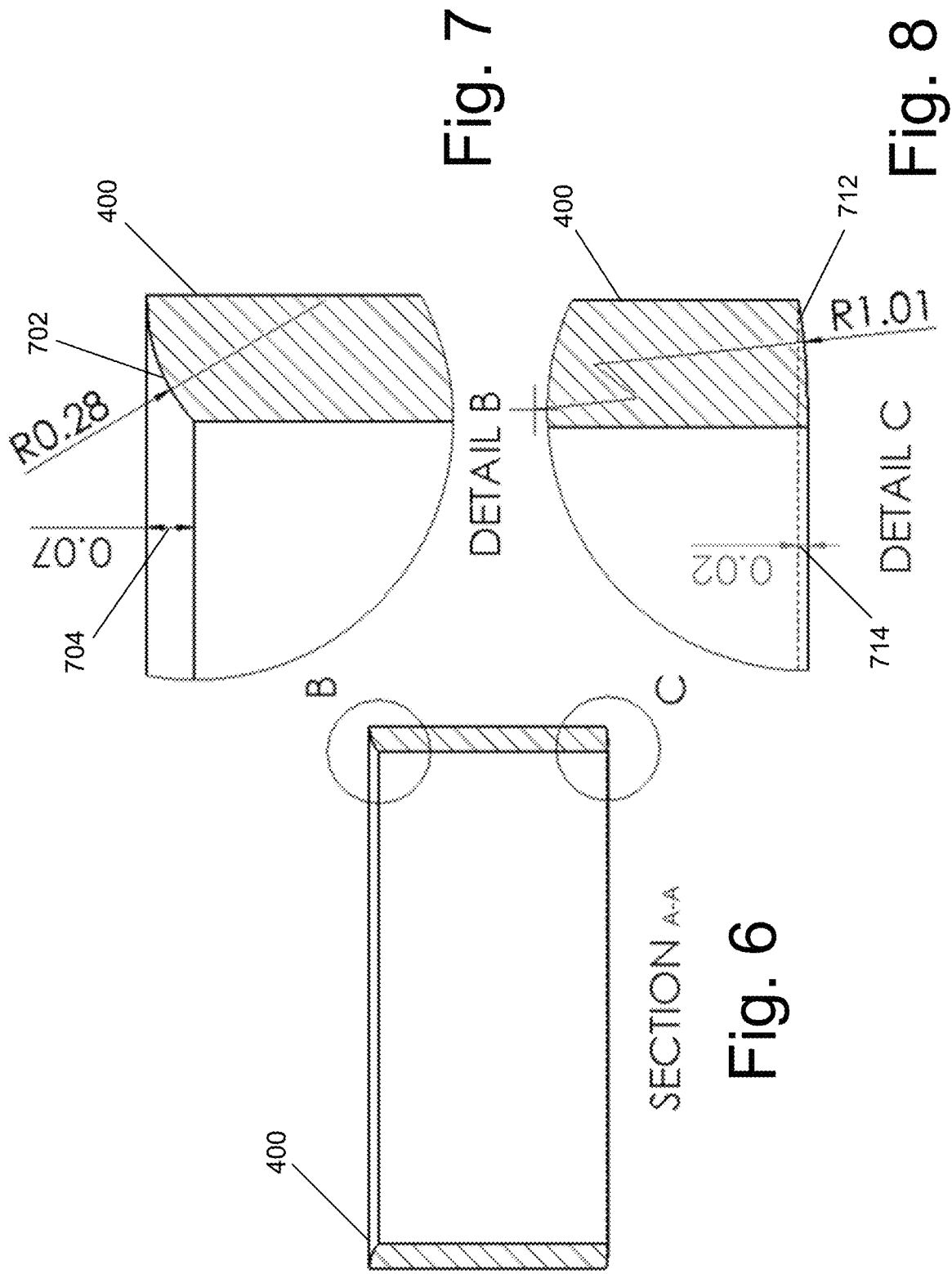

SEAL MECHANISM FOR WHEEL ASSEMBLIES

CROSS-REFERENCE TO RELATED APPLICATIONS

The application claims the benefit of priority from U.S. Provisional Patent Application No. 63/452,496, filed Mar. 16, 2023, entitled SEAL MECHANISM FOR WHEEL ASSEMBLIES, the disclosure of which is incorporated by reference in its entirety.

SUMMARY STATEMENT OF GOVERNMENT INTEREST

The present invention was made with support from the United States Department of Homeland Security (DHS) and by employees of DHS in the performance of their official duties. The U.S. Government has certain rights in this invention.

FIELD

The discussion below relates generally to apparatus and methods of protecting bearings against corrosion and degradation due to direct contact with debris, moisture, and/or other environmental contaminants or conditions.

BACKGROUND

Many heavy-duty wheel systems consist of two wheel halves or disk halves. One example is found in C-144 main landing gear wheels. The two disk halves may have a cavity formed between them when the two halves are coupled together. The cavity may allow environmental contaminants to reside between the disk halves, and for high-pressure rinse-water to dislodge bearing grease. The environmental contaminants may then be able to make direct contact with the bearings that reside in each disk half, resulting in accelerated degradation of the bearings. An apparatus designed to deflect incoming high-pressure rinse-water preventing dislodgement of bearing grease can lead to moisture entrainment and corrosion.

SUMMARY

Embodiments of the present invention are directed to apparatus and methods of protecting bearings against corrosion and degradation. In one example, a seal fits between two disk halves of a double-rimmed wheel.

The main landing gear wheels on a C-144 airplane each consist of two halves that are bolted together to provide a seat for the tire. Each wheel half has a roller bearing that allows the wheel to spin freely on the axle. The two wheel halves have water evacuation ports so that water and condensation can escape the cavity that forms between the wheel halves when they are bolted or otherwise attached together. However, these ports also allow water to enter the cavity. This is deleterious when the inflowing water is pressurized, as when the aircraft is being washed, and the pressurized water deflects down into the center of the wheel where the two roller bearings reside, dislodging the bearing grease. This wheel design does not incorporate inner seals to prevent the water in the cavity from making contact with the roller bearings. When pressurized water makes contact with the inner surface of the bearings, it displaces the grease protecting the rolling elements, allowing water to make contact with and reside against the bare steel of the bearing race and rolling elements. This causes the race and rolling elements of the bearing to corrode. Zero corrosion is permissible on these bearings. Corroded bearings are a safety risk until the corrosion is discovered and the bearings are immediately rejected and replaced upon discovery. The high number of rejected main landing gear wheel bearings is a costly requirement for the USCG C-144 post-depot maintenance product line. The aforementioned safety risk prior to detection should not be downplayed.

One feature of this environmental seal is to protect the bearing roller elements from direct impingement of pressurized water. Another feature is that the seal will also allow for the outflow of condensation that forms between the axle and the seal when it is installed. An additional feature is that the inner diameter of the seal is sized to allow for clearance from the axle such that the axle may turn unimpeded.

In specific embodiments, the seal material may be chosen to be chemically resistant to the bearing and axle greases, as well as inert to the environmental contaminants that it may encounter. The seal material may further be chosen to withstand high temperatures up to about 400° F. (e.g., 400° F.±20° F.). Because the C-144 brake pads reside in one of the wheel halves, the brakes quickly reach high temperatures upon braking during landing and the heat is quickly conducted through the entire aluminum rim, which will be in direct contact with the environmental seal. Another feature of the seal material is that it has high toughness and sufficient tensile strength to withstand the centrifugal forces of the spinning wheel. The seal material is sufficiently strong to preserve its structural integrity and maintain its position between the wheel halves, such that it does not become a FOD (foreign object debris) risk. The material is sufficiently tough so that it can withstand rough handling as well as repeated uninstallation/reinstallation cycles and does not become an unforeseen additional hazard to the airworthiness of the C-144 airframe. The material is sufficiently compressible such that when the disk halves are bolted together, they impart a compressive force on the seal, locking it in place, and pressing the seal material against the metal rim interior to form a water-tight seal. Examples of a suitable seal material include silicone rubber and silicone rubber structurally stiffened with additives.

In one example, an environmental seal for a double-rimmed wheel includes: a flexible material such as elastomeric or rubber material, a cylindrical body mating to both inner disk surfaces of the double-rimmed wheel, and one or more drain holes configured to substantially deflect incoming spray or matter but allow condensate to evacuate. The seal is configured to be sandwiched between two disk halves of the double-rimmed wheel when the disk halves are installed, with a hollow inner diameter having an allowance for the insertion of a wheel axle. The seal has mating ends that are graduated to match the radius of each wheel half, the two radii being different. That is, the first seal end is graduated to match a profile of the first inner disk surface of the first disk half and the second seal end is graduated to match a profile of the second inner disk surface of the second disk half. The profile of the first inner disk surface of the first disk half is characterized by a first radius, the profile of the second inner disk surface of the second disk half is characterized by a second radius, and the first radius and the second radius are different. The flexible rubber material is compressible to enhance the seal, but sturdy enough to withstand the centrifugal forces of the rapidly turning wheels, and has an operable temperature range of about −65° F. to 400° F. (e.g., −70° F. to 420° F.).

An aspect of the invention is directed to a seal for a wheel assembly having a first disk half and a second disk half. The seal comprises a cylindrical body having a hollow interior, a first seal end configured to mate with a first inner disk surface of the first disk half, and a second seal end configured to mate with a second inner disk surface of the second disk half, and one or more drain holes. The cylindrical body has a cylindrical wall with the one or more drain holes configured to substantially deflect incoming matter into the hollow interior and to allow condensate to evacuate from the hollow interior through the one or more drain holes. The cylindrical body comprises an elastomeric material.

Another aspect of the invention is directed to a wheel assembly sealing system including a first disk half and a second disk half. The system comprises: a first disk half having a first inner disk surface; a first bearing surrounded by the first disk half, a second disk half having a second inner disk surface; a second bearing surrounded by the second disk half, and a flexible seal having a cylindrical body which includes a hollow interior, a first seal end configured to mate with the first inner disk surface of the first disk half, and a second seal end configured to mate with the second inner disk surface of the second disk half. The cylindrical body of the flexible seal surrounds a space between the first bearing and the second bearing.

Yet another aspect of the invention is directed to a sealing method for a wheel assembly, which includes a first disk half having a first inner disk surface, a first bearing surrounded by the first disk half, a second disk half having a second inner disk surface, and a second bearing surrounded by the second disk half. The sealing method comprises placing a flexible seal having a cylindrical body which includes a hollow interior, a first seal end mating with the first inner disk surface of the first disk half, and a second seal end mating with the second inner disk surface of the second disk half. The cylindrical body of the flexible seal surrounds a space between the first bearing and the second bearing.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 6 is a cross-sectional view of the seal along A-A of FIG. 5.

FIG. 7 shows detail B of FIG. 6.

FIG. 8 shows detail C of FIG. 6.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Figure 1:
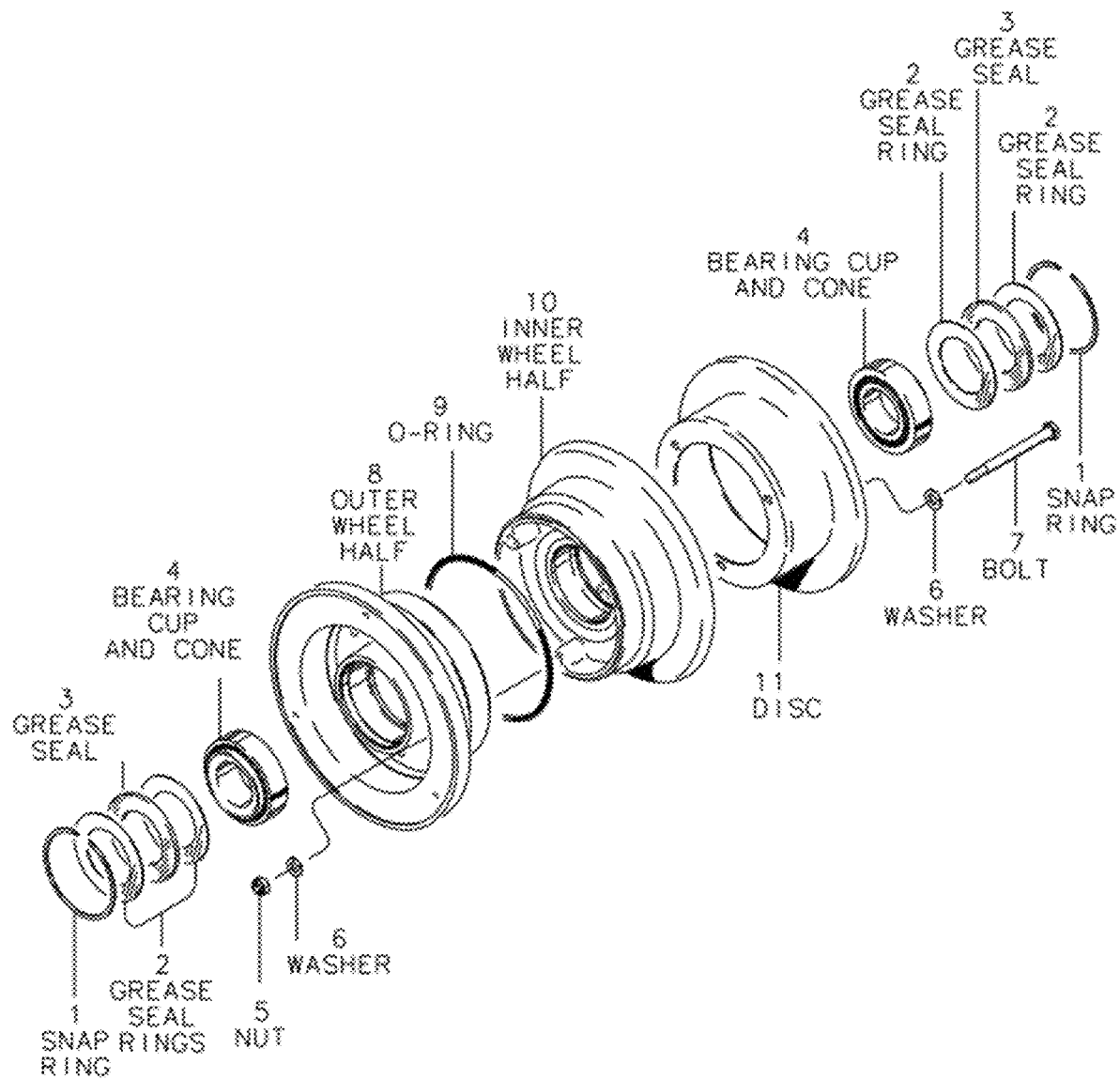
FIG. 1 is an exploded view of a typical wheel assembly.

FIG. 1 is an exploded view of a typical wheel assembly. From a first end to a second end, the parts include a first snap ring 1, a pair of first grease seal rings 2 with a first grease seal 3 disposed between them, a first bearing cup and cone 4, a nut 5 and a first washer 6, a first or outer wheel half 8, an O-ring 9, a second or inner wheel half 10, a disk 11, a second washer 6 and a bolt 7, a second bearing cup and cone 4, a pair of second grease seal rings 2 with a second grease seal 3 disposed between them, and a second snap ring 1.

Figure 2:
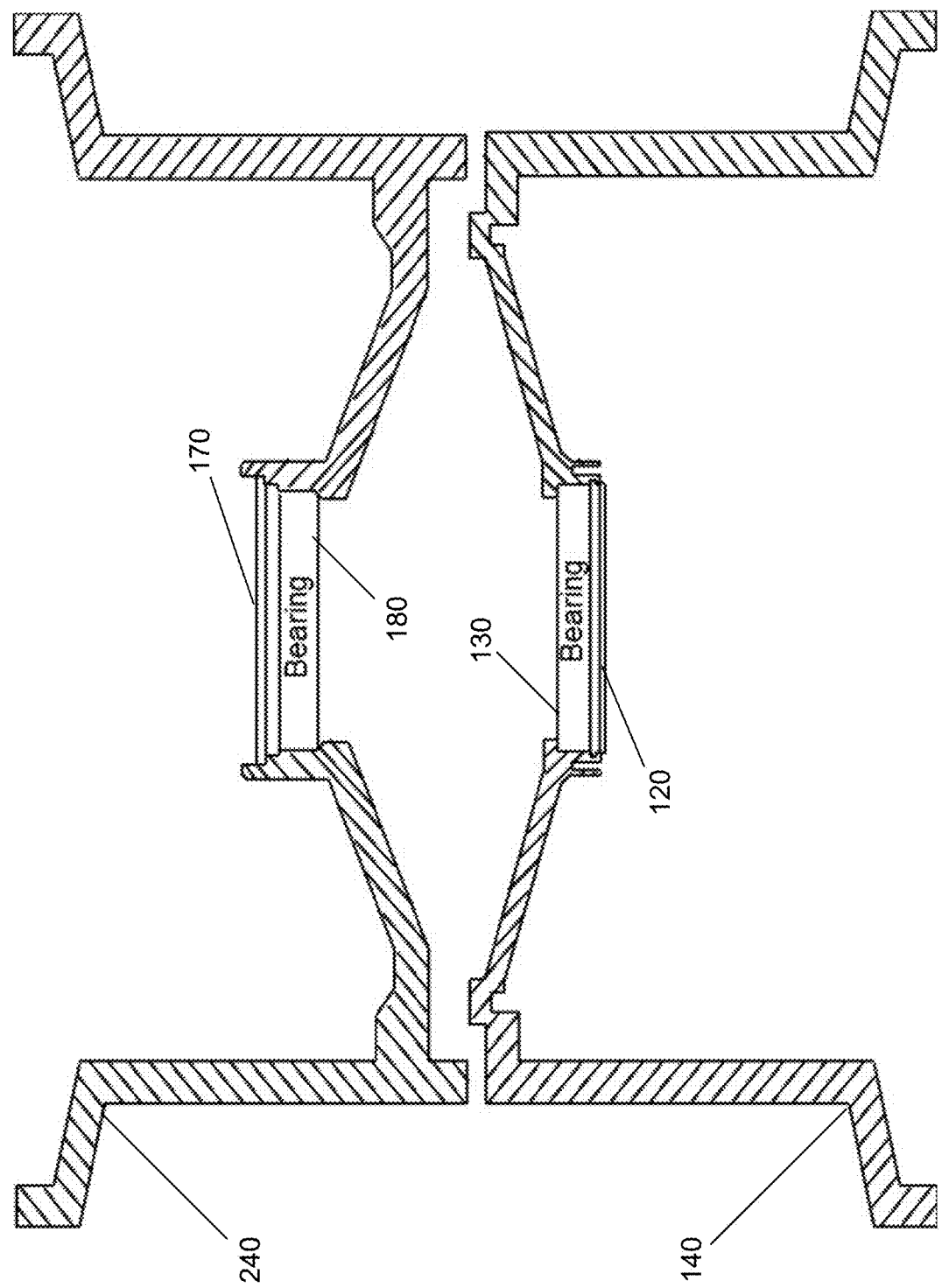
FIG. 2 is a cross-sectional view of a main landing gear wheel assembly for a C-144 airplane.

FIG. 2 is a cross-sectional view of a main landing gear wheel assembly for a C-144 airplane. The wheel halves (first/lower wheel half 140 and second/upper wheel half 240) are joined with bolts, washers, and nuts. When the wheel halves 140, 240 are joined, a cavity forms between the wheel halves. This cavity is exposed to the outside environment via holes in the wheels. The bearings 180 (first/lower bearing) and 130 (second/upper bearing) that reside in each wheel half have no inner seal protecting them from anything that enters the cavity between the wheel halves. The bearings 180 and 130 have outer seals 170 and 120 protecting them from the outside, but nothing on the inside.

In embodiments, an environmental seal (400 in FIGS. 3 and 4) is configured to be disposed between the two main landing gear disk halves. A relevant lower/first disk portion (first or lower wheel half disk portion) and a relevant upper/second disk portion (second or upper wheel half disk portion) mate with the seal. The first or lower wheel half disk portion has a first/lower bearing (910 in FIG. 9) residing therein. The second or upper wheel half disk portion has a second/upper bearing (920 in FIG. 9) residing therein.

Figure 3:
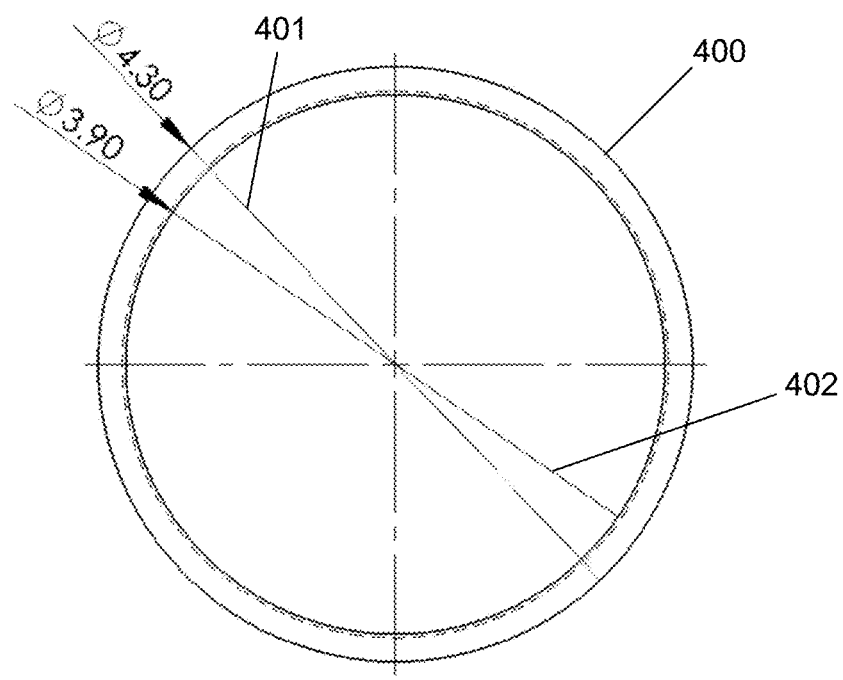
FIG. 3 is a top view of the seal.
Figure 4:
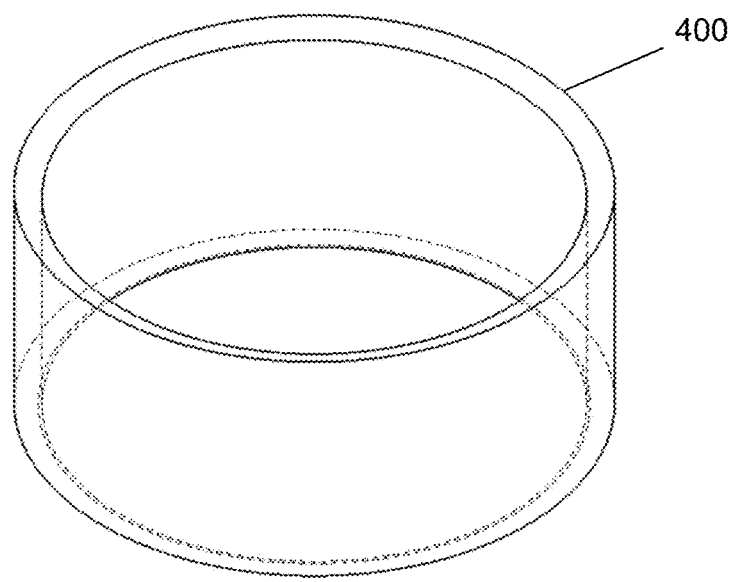
FIG. 4 is a perspective view of the seal.

FIG. 3 is a top view of the seal 400. FIG. 4 is a perspective view of the seal 400 with a seal wall. The seal 400 has a circular cylindrical body with a cylindrical wall and a hollow interior. In one example, the seal 400 has an outer diameter 401 of about 4.3 inches and an inner diameter 402 of about 3.9 inches.

Figure 5:
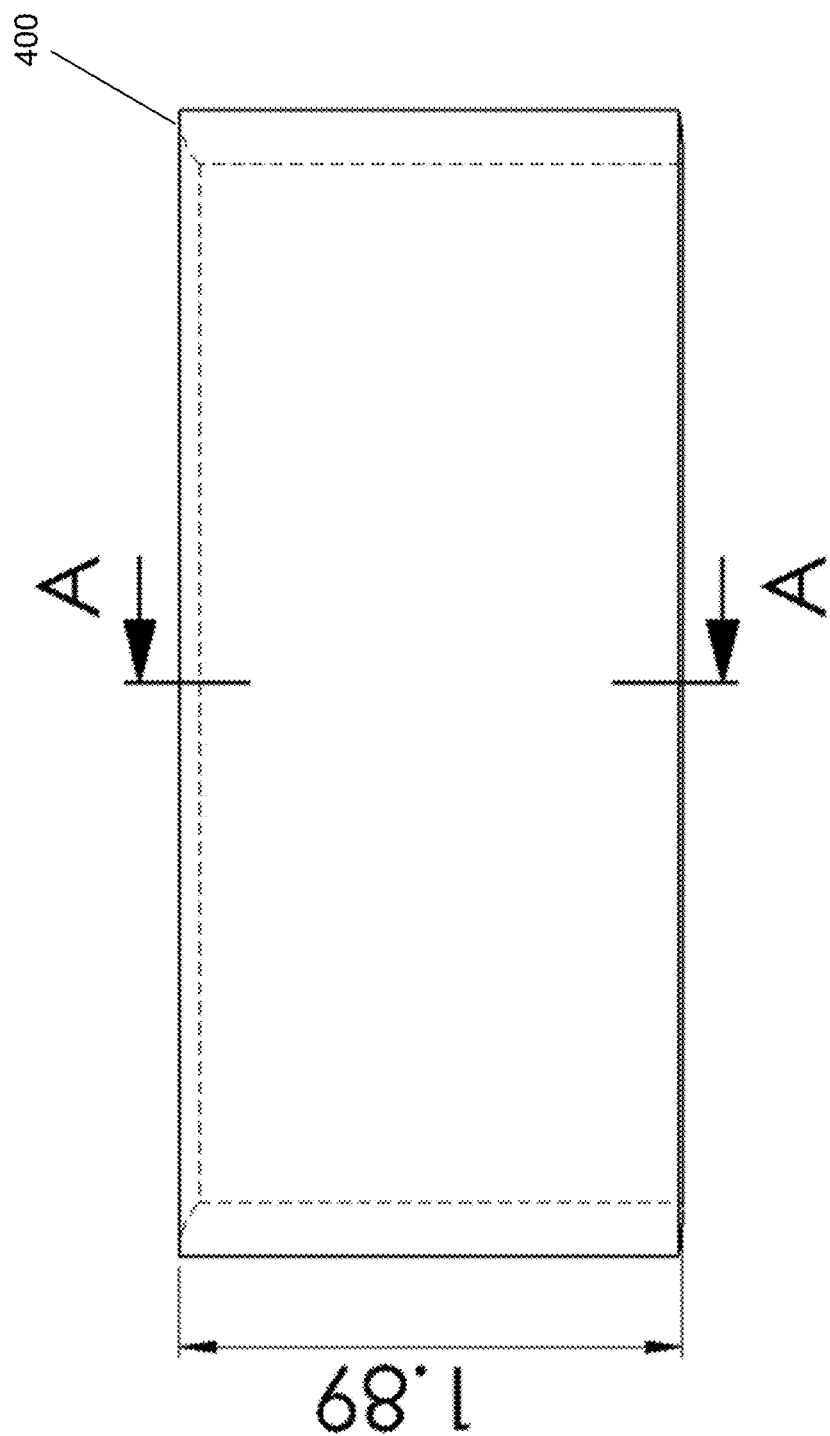
FIG. 5 is an elevational view of the seal.

FIG. 5 is an elevational view of the seal 400. The height of the seal 400 in this example is about 1.89 inches.

FIG. 6 is a cross-sectional view of the seal 400 along A-A of FIG. 5. FIG. 7 shows detail B of FIG. 6. FIG. 8 shows detail C of FIG. 6. As seen in FIG. 7, one side (upper side as shown) of the seal 400 has an inwardly oriented radius of curvature 702 of about R=0.28" with a total rise 704 from low side to high side of about 0.07 inches in this example.

As seen in FIG. 8, the other side (lower side as shown) of the seal 400 has an inwardly oriented radius of curvature 712 of about R=1.01" with a total rise 714 from low side to high side of about 0.02 inches in this example.

Figure 9:
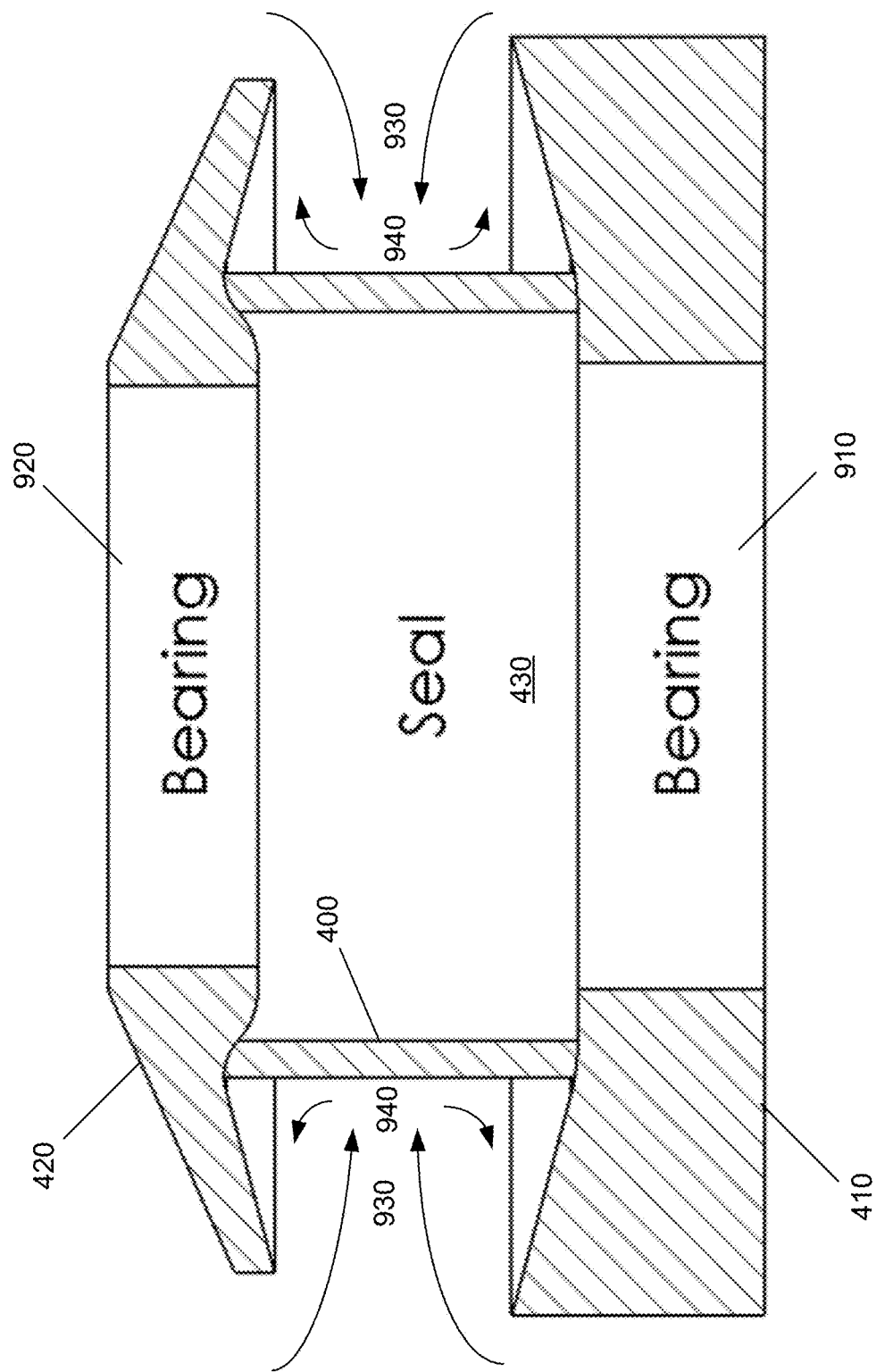
FIG. 9 shows a cross-sectional view of the seal as installed between and mating with the lower/first disk portion and upper/second disk portion of the landing gear.

FIG. 9 shows a cross-sectional view of the seal 400 as installed between and mating with the lower/first disk portion 410 and upper/second disk portion 420 of the landing gear. The first or lower wheel half disk portion 410 has a first/lower bearing 910 residing therein. The second or upper wheel half disk portion 420 has a second/upper bearing 920 residing therein. The inward pointing arrows 930 represent the influx of environmental contaminants that are substantially deflected by the seal wall of the seal 400, as represented by the outward pointing arrows 940. The seal 400 may include one or more drain holes through the seal wall configured to substantially deflect incoming spray into the hollow interior 430 but allow condensate to evacuate from the hollow interior through the one or more drain holes. For example, the seal deflects at least 90% or 95% or 98% of the incoming spray (e.g., incoming particulate and/or fluidic matters or substances) into the hollow interior and the one or more drain holes allow condensate to evacuate from the hollow interior.

Because the two wheel halves (e.g., 140, 240 in FIG. 2) have different radii, the radius taper of the seal 400 on the two sides are different. Edges of the seal 400 (see FIGS. 7 and 8) may conform to the different radii of the two wheel halves. The inner diameter of the seal 400 is larger than the outer diameter of the axle shaft. The seal 400 may have a slightly larger height parameter to cause a compressive interference fit to guarantee sealing with the lower/first disk portion 410 and upper/second disk portion 420 of the landing gear.

Figure 10:
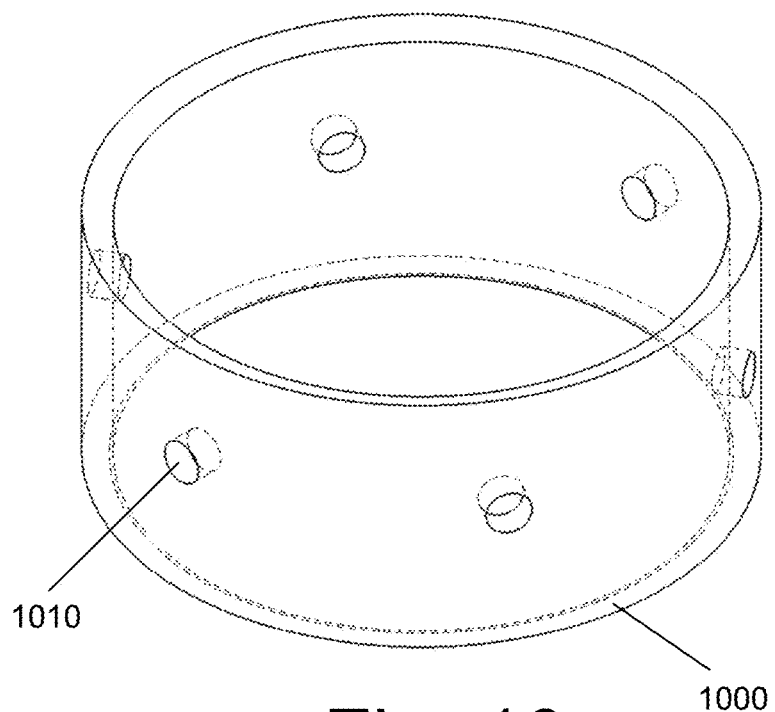
FIGS. 10 and 11 illustrate an example of a seal having drain holes or openings which are normal to the seal wall.
Figure 11:
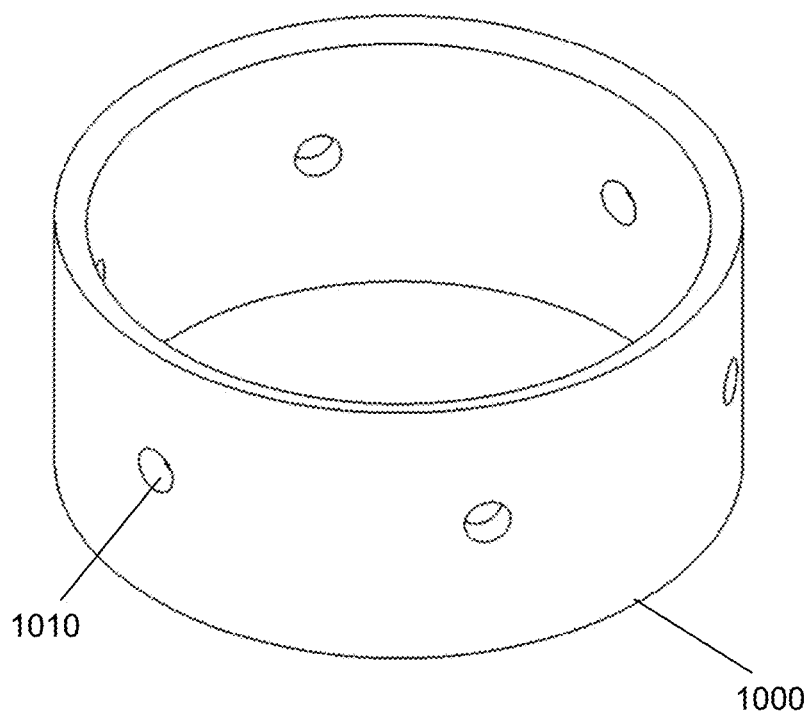

FIGS. 10 and 11 illustrates an example of a seal 1000 having drain holes or openings 1010 which are normal to the seal wall or the longitudinal axis of a circular seal 1000. The drain holes 1010 may have other shapes, different sizes, different numbers, or different arrangements. In embodiments, the drain holes 1010 each have an area that is equal to or less than 2% or 1% or 0.5% of the entire area (i.e., surface area) of the seal wall. The total area of the plurality of drain holes 1010 may be equal to or less than 6% or 4% or 2% of the entire area of the seal wall. The number of drain holes 1010 may be at least two or at least four or at least six. The plurality of drain holes 1010 are distributed evenly around the seal wall which may be a cylindrical wall.

Figure 12:
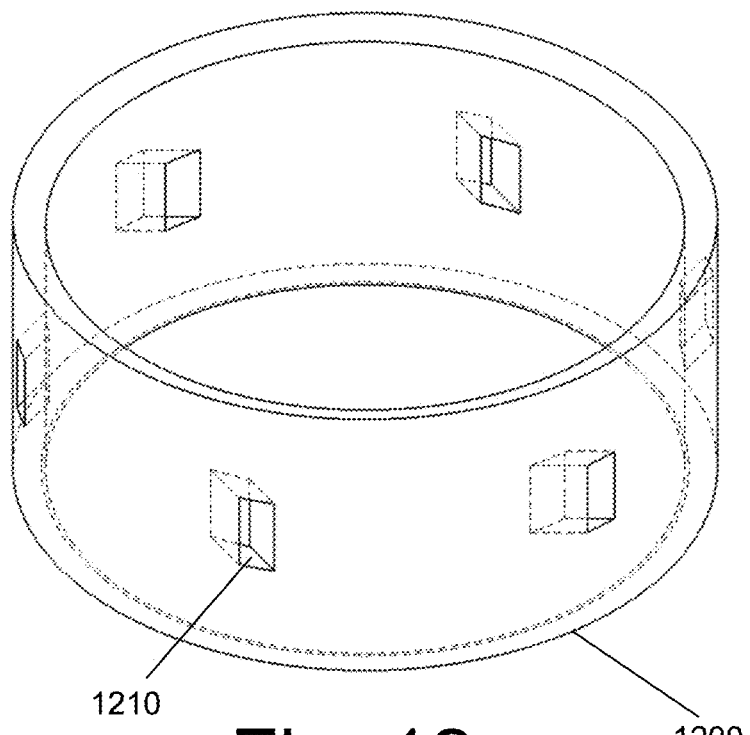
FIGS. 12 and 13 illustrate an example of a seal having drain holes or openings which are circumferentially angled slots through the seal wall.
Figure 13:
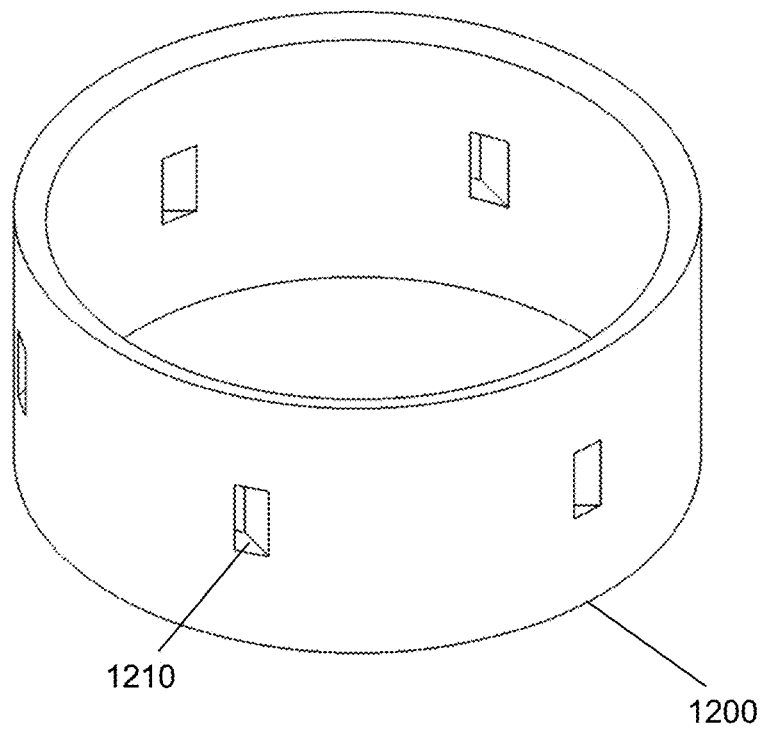

FIGS. 12 and 13 illustrate an example of a seal 1200 having drain holes or openings which are circumferentially angled slots 1210 through the seal wall. The angled slots 1210 may be angled or slanted to allow condensate to evacuate outwardly from the seal 1200 via the angled slots 1210 toward the direction of rotation of the wheel (axle spin direction for forward motion of the vehicle) or opposite the direction of rotation of the wheel. As seen in FIGS. 12 and 13, the angled slots 1210 are slanted to allow condensate to evacuate outwardly from the seal 1200 via the angled slots 1210 opposite the direction of rotation of the wheel. The angle relative to the tangent to the circumferential surface may be about 100 to about 80°, or about 200 to about 60°, or about 300 to about 45°. The angled slots 1210 may have other shapes, different sizes, different numbers, or different arrangements.

Figure 14:
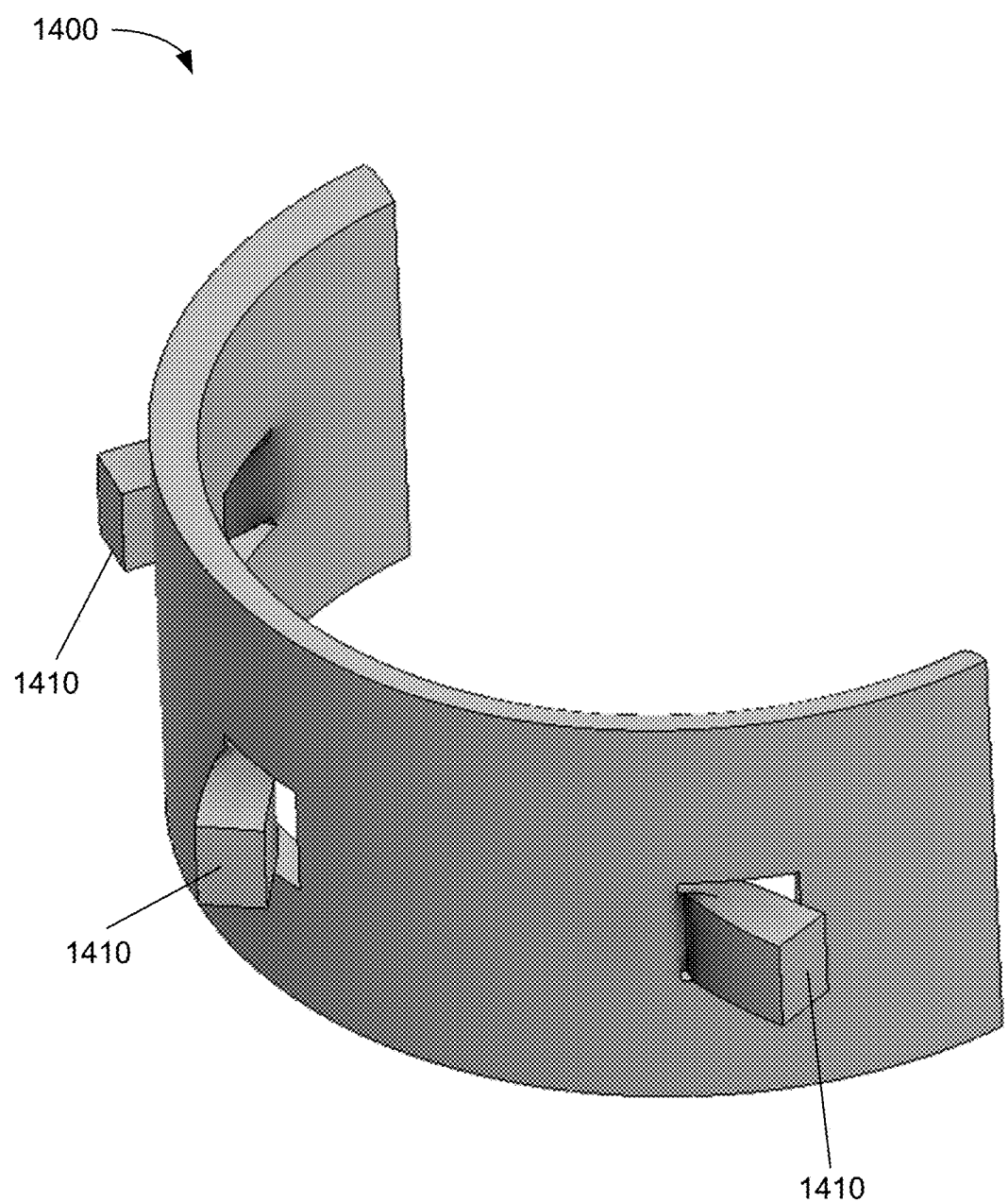
FIG. 14 illustrates an example of a portion of a seal having drain holes or openings with flaps in open positions.

FIG. 14 illustrates an example of a portion of a seal 1400 having drain holes or openings with flaps 1410 in open positions. In the open positions, the flaps 1410 extend outwardly from the seal wall. The flaps 1410 may be centrifugal flaps oriented to allow condensate to evacuate outwardly from the seal 1400 via the centrifugal flaps 1410 toward the direction of rotation of the wheel (axle spin direction for forward motion of the vehicle) or opposite the direction of rotation of the wheel. As seen in FIG. 14, the centrifugal flaps 1410 are oriented to allow condensate to evacuate outwardly from the seal 1400 via the centrifugal flaps 1410 opposite the direction of rotation of the wheel. The angle relative to the tangent to the circumferential surface may be about 100 to about 80°, or about 200 to about 60°, or about 300 to about 45°. The centrifugal flaps 1410 and their associated drain holes may have other shapes, different sizes, different numbers, or different arrangements.

The centrifugal flaps 1410 are fixed in the open position of FIG. 14 in embodiments. In alternative embodiments, the centrifugal flaps 1410 may be flexible and/or movable between open and closed positions. For instance, the centrifugal flaps 1410 may be configured to open up due to and proportional to centrifugal forces of the spinning wheel.

Figure 15:
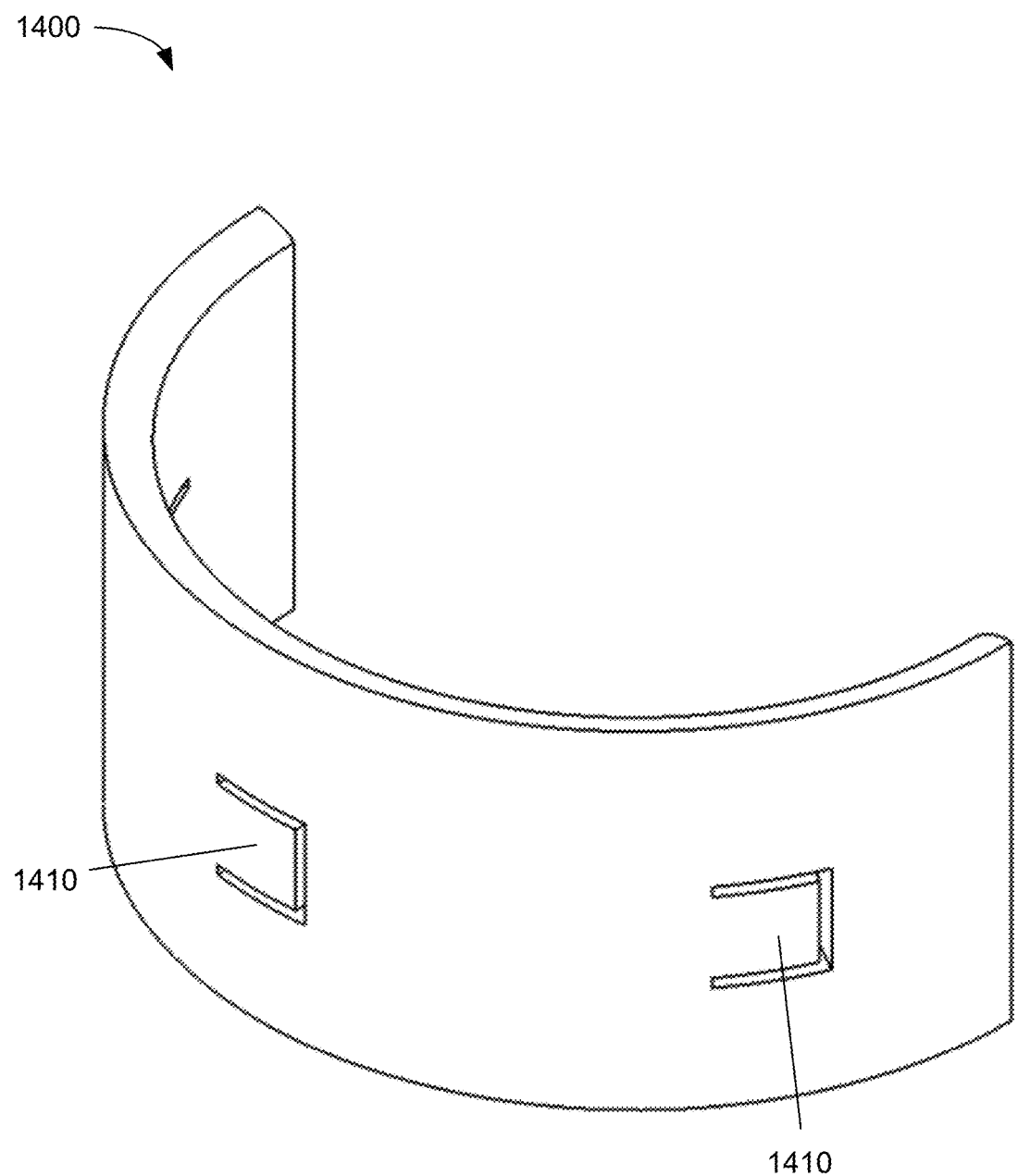
FIG. 15 illustrates an example of a portion of the seal of FIG. 14 showing the flaps in closed positions.

FIG. 15 illustrates an example of a portion of the seal of FIG. 14 showing the flaps 1410 in closed positions. When the wheel is not spinning, the centrifugal flaps 1410 may be disposed in the closed positions as shown in FIG. 15 or in slightly open positions (e.g., less than 20% or 10% of the angle in the open positions as seen in FIG. 14 when the wheel is spinning at top speed).

Figure 16:
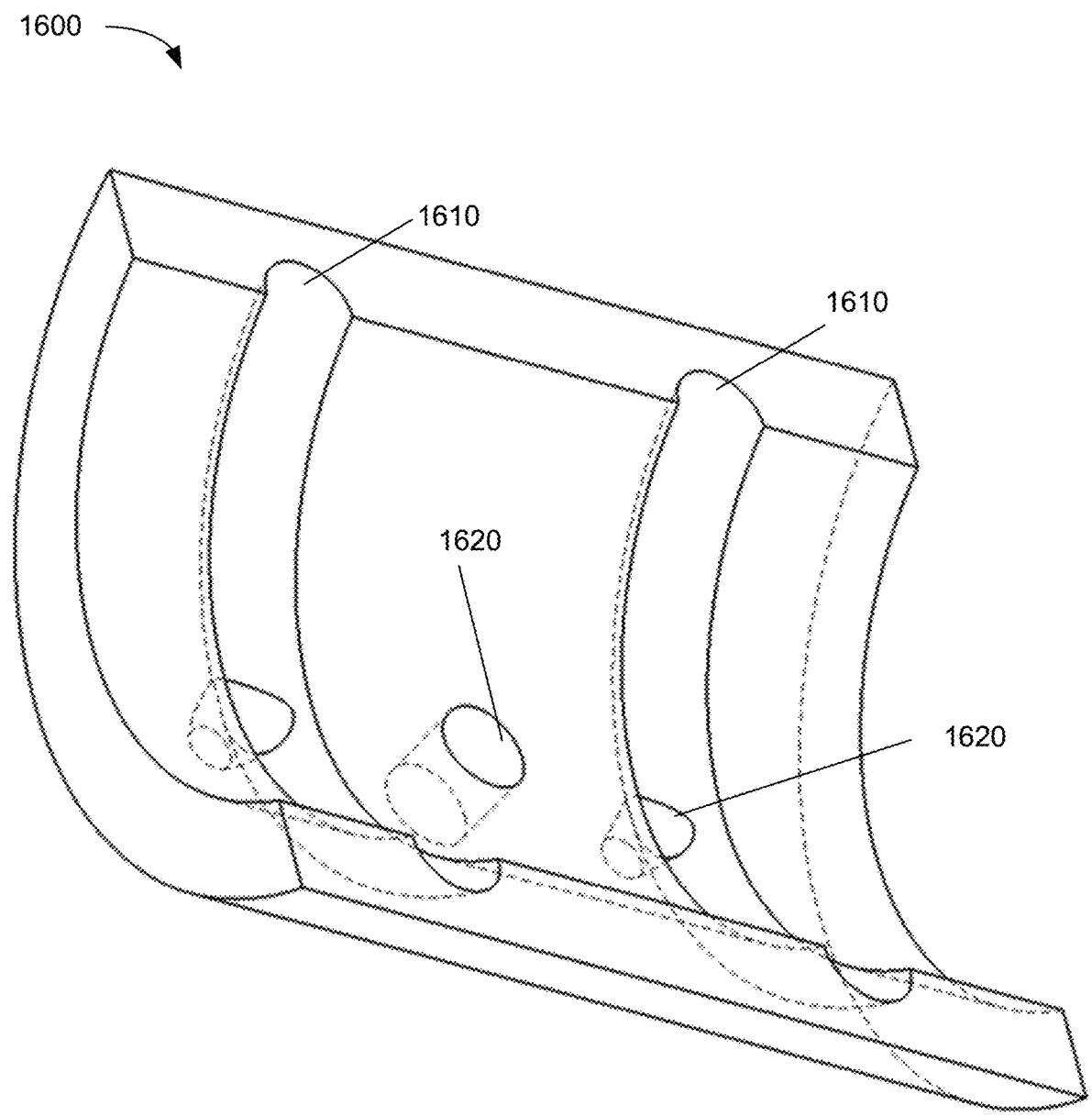
FIG. 16 illustrates an example of a portion of a seal having interior surface grooves for the drain holes or openings.

FIG. 16 illustrates an example of a portion of a seal having interior surface grooves for the drain holes or openings. The interior surface of the seal 1600 includes one or more interior surface grooves 1610. The interior surface grooves 1610 may be circumferential interior surface grooves that are oriented horizontally. In another embodiment, the interior surface grooves may be formed at an angle with respect to the horizontal plane to be spiral interior surface grooves. At least some of the drain holes or openings coincide with or overlap the interior surface grooves 1610 which encourage water egress via those coinciding or overlapping openings 1620.

In some embodiments, the interior surface grooves may provide one or more linear slopes to channel water to the egress holes 1620. In other embodiments, the interior surface grooves may provide curved slopes to channel water to the egress holes. The curved slopes around the inside egress holes can channel the water. In specific embodiments, the interior surface grooves 1610 have a geometric surface design which can aid in channeling liquid such as water to the egress holes. Rotating the wheel assembly allows condensate to evacuate outwardly from the hollow interior of the flexible seal via the one or more interior surface grooves through the one or more drain holes.

The inventive concepts taught by way of the examples discussed above are amenable to modification, rearrangement, and embodiment in several ways. For example, this invention may be applicable in other systems having different geometries, sizes, or arrangements of components. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A seal for a wheel assembly including a first disk half and a second disk half, the seal comprising:
    a cylindrical body having a hollow interior, a first seal end configured to mate with a first inner disk surface of the first disk half, and a second seal end configured to mate with a second inner disk surface of the second disk half, and one or more drain holes, the cylindrical body having a cylindrical wall with the one or more drain holes being configured to substantially deflect incoming matter into the hollow interior and to allow condensate to evacuate from the hollow interior through the one or more drain holes, the cylindrical body comprising an elastomeric material.

2. The seal of claim 1,
    wherein at least one drain hole of the one or more drain holes is normal to the cylindrical wall.

3. The seal of claim 1,
    wherein at least one drain hole of the one or more drain holes is slanted at an angle relative to the cylindrical wall.

4. The seal of claim 3,
    wherein the at least one drain hole is slanted at the angle relative to the cylindrical wall to allow condensate to evacuate outwardly from the hollow interior of the seal.

5. The seal of claim 1,
    wherein the cylindrical wall includes a flap at at least one drain hole of the one or more drain holes.

6. The seal of claim 5,
    wherein the flap is a centrifugal flap oriented at an angle relative to the cylindrical wall to allow condensate to evacuate outwardly from the seal through the at least one drain hole by the centrifugal flap opposite a direction of rotation of the wheel assembly for forward motion.

7. The seal of claim 1,
    wherein each drain hole of the one or more drain holes has an area which is equal to or less than 2% of an entire area of the cylindrical wall.

8. The seal of claim 1, comprising a plurality of drain holes distributed around the cylindrical wall,
    wherein the plurality of drain holes have a total area which is equal to or less than 6% of an entire area of the cylindrical wall.

9. The seal of claim 1, comprising at least four drain holes distributed evenly around the cylindrical wall.

10. The seal of claim 1,
    wherein the first seal end is graduated to match a profile of the first inner disk surface of the first disk half and the second seal end is graduated to match a profile of the second inner disk surface of the second disk half.

11. The seal of claim 10,
    wherein the profile of the first inner disk surface of the first disk half and the profile of the second inner disk surface of the second disk half are different.

12. The seal of claim 10,
    wherein the profile of the first inner disk surface of the first disk half comprises a first radius, the profile of the second inner disk surface of the second disk half comprises a second radius, and the first radius and the second radius are different.

13. The seal of claim 1,
    wherein the cylindrical body includes one or more interior surface grooves each overlapping a drain hole of the one or more drain holes.

14. The seal of claim 13,
    wherein the one or more interior surface grooves include one or more circumferential interior surface grooves.

15. A wheel assembly sealing system for a wheel assembly, the wheel assembly sealing system comprising:
    a first disk half having a first inner disk surface;
    a first bearing surrounded by the first disk half;
    a second disk half having a second inner disk surface;
    a second bearing surrounded by the second disk half; and
    a seal having a hollow cylindrical body which includes a hollow interior, a first open seal end configured to mate with the first inner disk surface of the first disk half, and a second open seal end configured to mate with the second inner disk surface of the second disk half, the hollow cylindrical body of the seal surrounding a hollow cylindrical space between the first bearing and the second bearing;
    wherein the hollow cylindrical body includes one or more drain holes and is configured to substantially deflect incoming matter from impinging upon the hollow cylindrical space and to allow condensate to evacuate from the hollow cylindrical space through the one or more drain holes.

16. The wheel assembly sealing system of claim 15,
    wherein the hollow cylindrical body has a cylindrical wall and at least one drain hole of the one or more drain holes is slanted at an angle relative to the cylindrical wall.

17. The wheel assembly sealing system of claim 16,
    wherein the at least one drain hole is slanted at the angle relative to the cylindrical wall to allow condensate to evacuate outwardly from the hollow cylindrical space of the seal through the at least one drain hole opposite a direction of rotation of the wheel assembly for forward motion.

18. The wheel assembly sealing system of claim 15,
    wherein the hollow cylindrical body has a cylindrical wall which includes a flap at at least one drain hole of the one or more drain holes.

19. The wheel assembly sealing system of claim 18,
    wherein the flap is a centrifugal flap oriented at an angle relative to the cylindrical wall to allow condensate to evacuate outwardly from the hollow cylindrical space of the seal through the at least one drain hole by the centrifugal flap opposite a direction of rotation of the wheel assembly for forward motion.

20. The wheel assembly sealing system of claim 15, wherein the hollow cylindrical body includes one or more interior surface grooves each overlapping a drain hole of the one or more drain holes.

21. The wheel assembly sealing system of claim 20, wherein the one or more interior surface grooves include one or more circumferential interior surface grooves.

22. A sealing method for a wheel assembly, which includes a first disk half having a first inner disk surface, a first bearing surrounded by the first disk half, a second disk half having a second inner disk surface, and a second bearing surrounded by the second disk half; the sealing method comprising:
   placing, between the first disk half and the second disk half, a seal having a hollow cylindrical body which includes a hollow interior, a first open seal end mating with the first inner disk surface of the first disk half, and a second open seal end mating with the second inner disk surface of the second disk half, the hollow cylindrical body of the seal surrounding a hollow cylindrical space between the first bearing and the second bearing, the hollow cylindrical body including one or more drain holes;
   substantially deflecting incoming matter into the hollow cylindrical space with the hollow cylindrical body of the seal; and
   allowing condensate to evacuate from the hollow cylindrical space through the one or more drain holes.

23. The sealing method of claim 22, wherein the hollow cylindrical body has a cylindrical wall and at least one drain hole of the one or more drain holes is slanted at an angle relative to the cylindrical wall, the sealing method further comprising:
   rotating the wheel assembly to allow condensate to evacuate outwardly from the hollow cylindrical space of the seal through the at least one drain hole which is slanted at the angle relative to the cylindrical wall opposite a direction of rotation of the wheel assembly for forward motion.

24. The sealing method of claim 22, wherein the hollow cylindrical body has a cylindrical wall which includes a flap at at least one drain hole of the one or more drain holes, the sealing method further comprising:
   rotating the wheel assembly to allow condensate to evacuate outwardly from the hollow cylindrical space of the seal through the at least one drain hole by the flap opposite a direction of rotation of the wheel assembly for forward motion.

25. The sealing method of claim 22, wherein the hollow cylindrical body has a cylindrical wall which includes one or more interior surface grooves each overlapping a drain hole of the one or more drain holes, the sealing method further comprising:
   rotating the wheel assembly to allow condensate to evacuate outwardly from the hollow cylindrical space of the seal by the one or more interior surface grooves through the one or more drain holes.

* * * * *